Jan. 6, 1942.                R. A. FUNK                2,268,815
                          WELDING EQUIPMENT
                      Filed June 17, 1940           3 Sheets-Sheet 1

INVENTOR.
RUSSELL A. FUNK
BY
Whittemore Hulbert & Belknap
ATTORNEYS

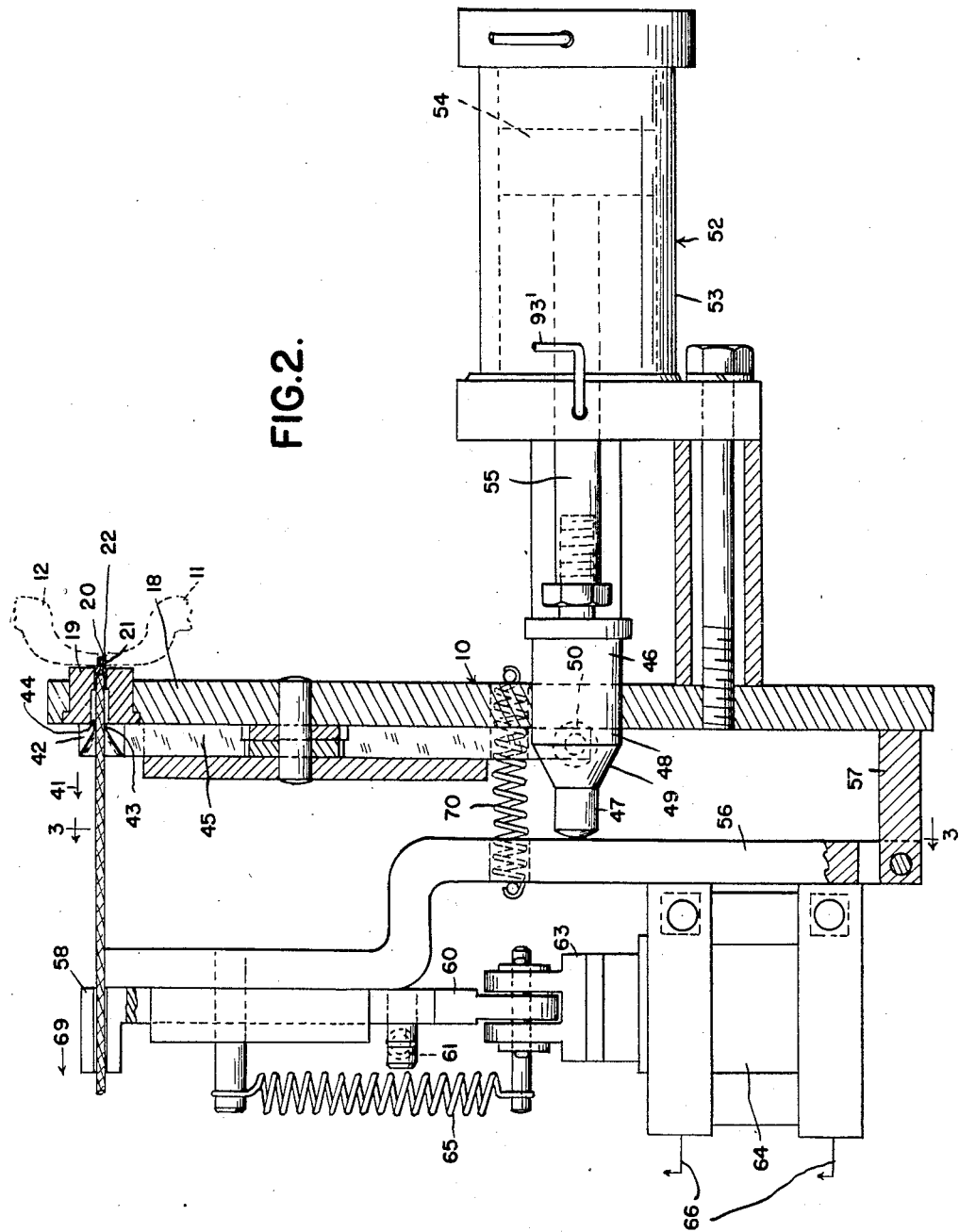

Jan. 6, 1942.                R. A. FUNK                    2,268,815
                          WELDING EQUIPMENT
                        Filed June 17, 1940              3 Sheets-Sheet 3
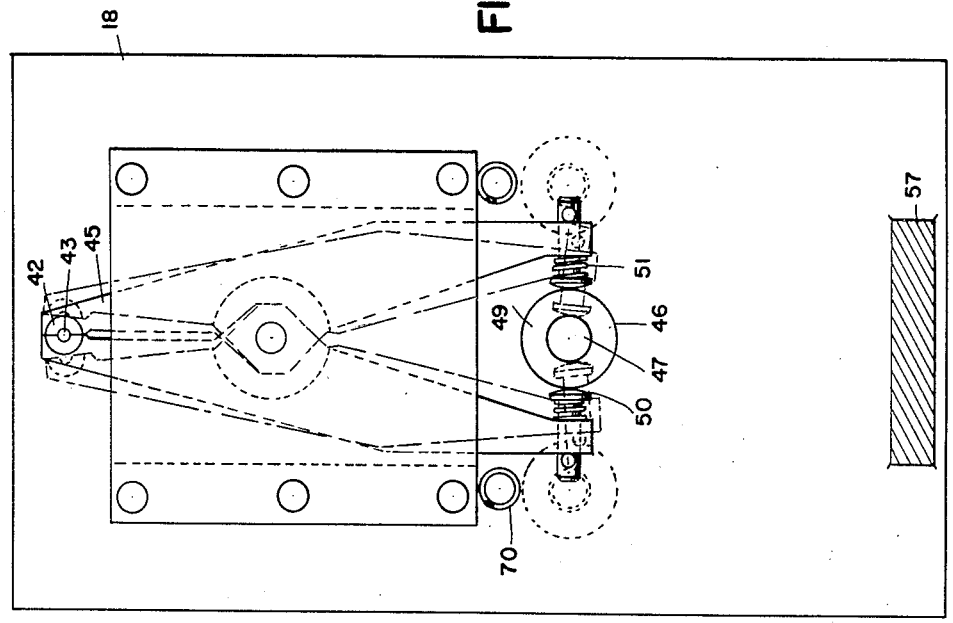
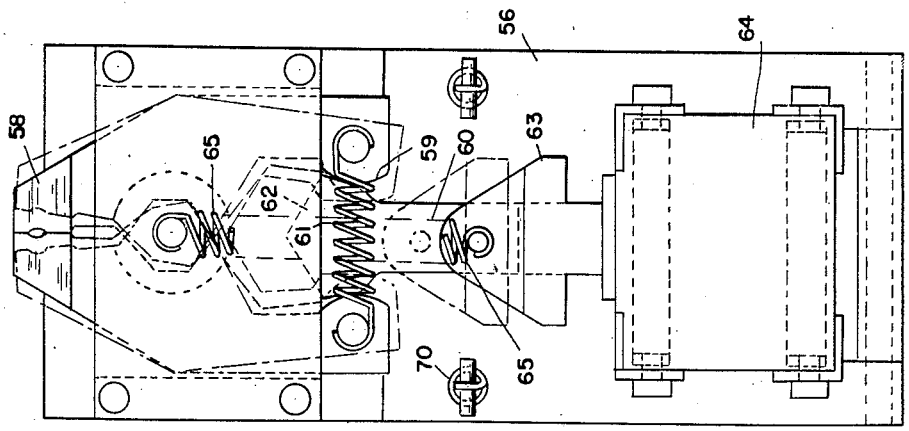
INVENTOR.
RUSSELL A. FUNK
BY
        ATTORNEYS Patented Jan. 6, 1942

2,268,815

UNITED STATES PATENT OFFICE 2,268,815

WELDING EQUIPMENT

Russell A. Funk, Pleasant Ridge, Mich.

Application June 17, 1940, Serial No. 341,037

11 Claims. (Cl. 29—33)

This invention relates generally to welding equipment and refers more particularly to means operating in conjunction with a welder for testing the weld.

It is one of the principal objects of this invention to provide means operating in timed relation to the completion of the weld to apply a force on the welded parts tending to separate the latter and thereby test the strength of the weld between the parts.

Another advantageous feature of this invention resides in the provision of mechanism operating automatically in timed relation to the operation of the welder to grip one of the welded parts and exert a pull on the latter with a force predetermined in dependence upon the specified strength of the weld. The arrangement is such as to permit sequentially welding the parts together and testing the strength of the weld in the minimum length of time which is advantageous, especially in cases where the parts are being manufactured on a production basis.

Still another object of this invention resides in the provision of testing mechanism of the type set forth above operated in dependence upon the pressure applied to the work by the electrodes to exert a pull on one of the parts of the work with a force sufficient to effectively test the strength of the weld.

A further advantageous feature of this invention resides in the provision of testing mechanism wherein the force applied to one of the parts to test the weld is obtained by a fluid pressure operated cylinder and wherein the fluid pressure admitted to the cylinder is controlled by means capable of regulation to permit applying different testing pressures on the weld.

In addition to the foregoing, the present invention contemplates welding equipment wherein the electrodes are relatively moved into clamping engagement with the work by a fluid pressure operated cylinder and wherein the fluid under pressure admitted to the cylinder is controlled by a pressure relief means having the pressure relief discharge port communicating with the weld testing cylinder to operate the testing mechanism in dependence upon a predetermined pressure rise in the electrode operating cylinder.

The foregoing, as well as other objects, will be made more apparent as this description proceeds, especially when considered in connection with the accompanying drawings, wherein:

Figure 2 is a sectional side elevational view of a welder and showing the weld testing mechanism in conjunction with the welder;

Figure 3 is a sectional view taken substantially on the plane indicated by the line 3—3 of Figure 2;

Figure 4 is an end elevational view of the weld testing mechanism.

Figure 1:
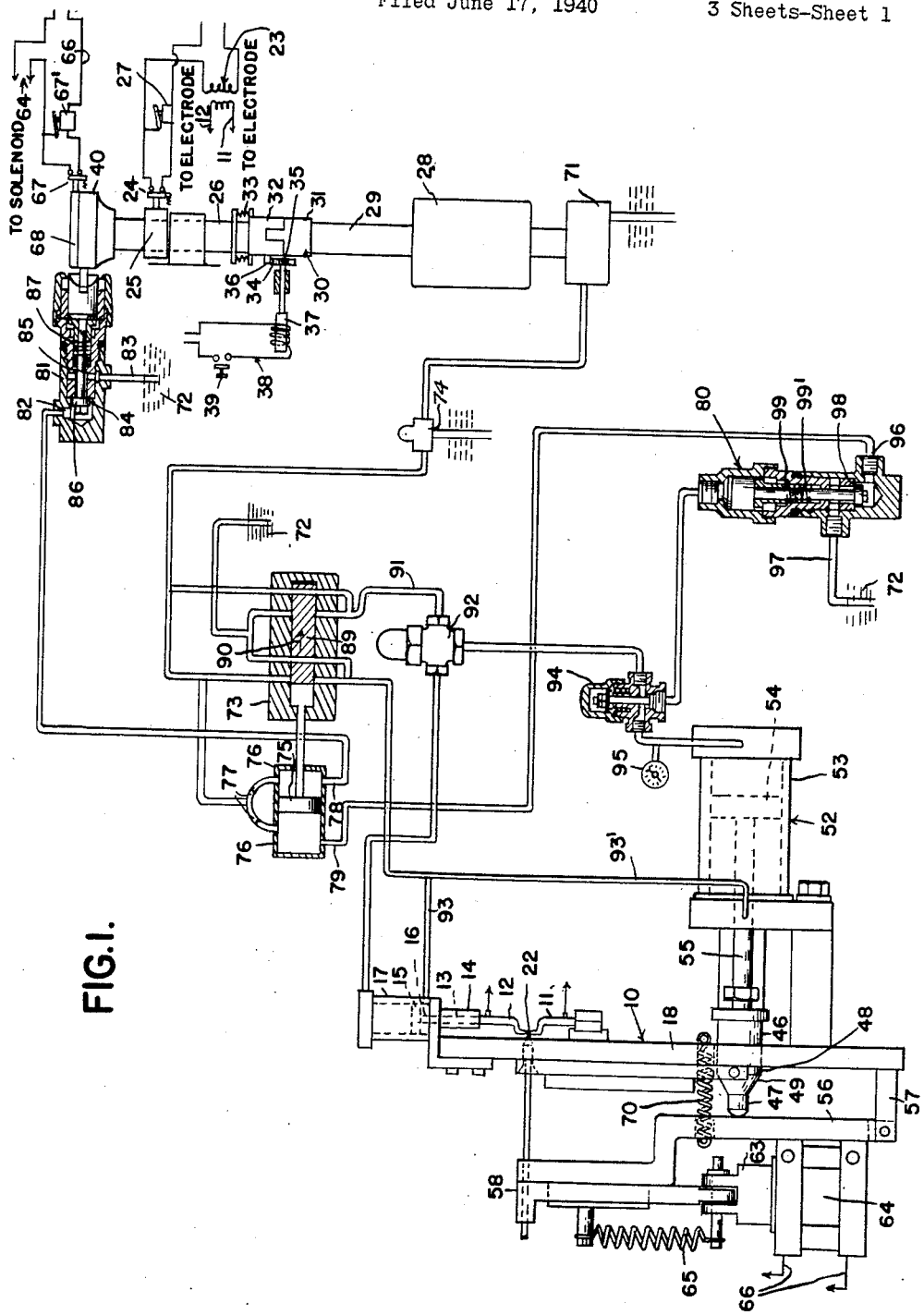
Figure 1 is a diagram illustrating welding equipment constructed in accordance with this invention.

For the purpose of illustrating the present invention, I have shown welding equipment specially designed for the purpose of welding a terminal fitting to one end of an electrical conductor, although it will, of course, be understood as this description proceeds that the invention is applicable in all instances where it is desired to effectively test the strength of the weld between any two parts welded together. It may also be pointed out at this time that the mechanism for testing the weld may be successfully used in conjunction with welders of various different constructions. Therefore, the particular welder hereinafter referred to is shown for the purpose of illustration and should not be considered as restricting the invention.

In general, a resistance type welder 10 is shown having a fixed electrode 11 and having a cooperating movable electrode 12. The movable electrode 12 is secured to a plunger 13 reciprocably mounted in a sleeve 14 and operatively connected to a piston 15 by means of a connecting rod 16. The piston 15 is reciprocably mounted in a cylinder 17 connected into a hydraulic system of the flooded type in a manner to be more fully hereinafter described.

Upon reference to Figure 2, it will be noted that a supporting plate 18 is secured to the frame of the welder and a bushing 19 of dielectric material is secured to the plate 18 in a position opposite the electrodes. The bushing 19 is fashioned to support one end of an electrical conductor 20 having the insulation removed from the extremity thereof and having a terminal fitting 21 mounted on the bare extremity of the conductor. It will be observed from Figure 2 that the bore through the bushing is shaped to position the terminal fitting with the free end 22 thereof between the electrodes 11 and 12.

The electrodes 11 and 12 are electrically connected in the welding circuit 23 in accordance with conventional practice. The circuit 23 includes a switch 24 which is automatically closed by a cam 25 secured to the cam shaft 26 of the welder and is automatically opened by a time controlled relay 27. The general arrangement is such that the cam 25 operates to close the switch 24 after the electrodes are relatively moved into clamping engagement with the work and the time controlled relay 27 is adjusted to automatically open the switch 24 when sufficient time has elapsed to effect the desired weld.

It may be pointed out at this time that the cam shaft 26 is driven by a prime mover 28 having a drive shaft 29 operatively connected to the cam shaft 26 through the medium of a clutch 30. Upon reference to Figure 1, it will be noted that one part 31 of the clutch 30 is secured to the shaft 29 and the cooperating part 32 of the clutch is splined on the cam shaft 26. The part 32 is normally urged into clutching engagement with the part 31 by means of a spring 33. Engagement of the clutch part 32 with the part 31 is normally prevented by means of a cam 34 having a cam surface 35 adapted to abut a pin 36 carried by the clutch part 32. The cam 34 is moved out of the path of travel of the pin 36 by means of a solenoid 37 connected in an electric circuit 38 with a suitable manually operable switch 39. The arrangement is such that when the switch 39 is closed, the cam 34 is raised by the solenoid 37 out of engagement with the pin 36 and the spring 33 is then free to move the clutch part 32 into clutching engagement with the cooperating part 31. As soon as the switch 39 is opened, the cam 34 returns to its operative position with respect to the clutch 30 and the surface 35 on the cam cooperates with the pin 36 on the clutch part 32 to shift the latter away from the clutch part 31 against the action of the spring 33. As a result, rotation of the cam shaft 26 is discontinued and the cam 25 is prevented from operating the switch 24 in the welding circuit. It is important to note, however, that even though the switch 39 is opened immediately after it is closed by the operator, a sufficient rotation of the shaft 26 is insured to effect the necessary closing of the switch 24 by the cam 25.

A second cam 40 is secured to the cam shaft 26 for initiating the operation of the fluid pressure operated cylinder 17 to move the electrode 12 toward the electrode 11 and thereby clamp the end 22 of the terminal fitting therebetween. The cam 40 is so designed with respect to the cam 25 that it insures relative movement of the electrodes into clamping engagement with the end 22 of the terminal fitting before the cam 25 operates the switch 24 to close the welding circuit. As stated above, the time controlled relay 27 is adjusted to automatically open the welding circuit after the desired time interval elapses and, of course, this circuit is opened before the electrodes are relatively moved out of engagement with the end 22 of the terminal fitting. The means for relatively moving the electrodes out of engagement with the terminal fitting will be more fully hereinafter understood from the description of the hydraulic system.

After the terminal 21 is welded to the extremity of the electrical conductor 20, a pull is applied to the electrical conductor 20 in the direction of the arrow 41 in Figure 2 to test the strength of the weld between the terminal and the electrical conductor. Prior to exerting a pull on the electrical conductor 20 in the direction of the arrow 41, a bushing 42 is moved into juxta- position to the entrant end of the bushing 19 in a manner to locate the bore 43 through the bushing 42 in alignment with the bore through the bushing 19. The bore 43 has a diameter sufficiently large to freely receive the electrical conductor 20 but less than the maximum diameter of the inner end of the terminal 21. As a result, the bushing forms an annular shoulder 44 engageable with the inner end of the terminal in the event the pulling force applied to the electrical conductor is sufficient to disengage the terminal fitting from the electrodes.

Upon reference to Figures 2 and 3, it will be noted that the bushing 42 is formed of two complementary halves respectively secured to the upper ends of a pair of arms 45 which, in turn, are pivotally supported intermediate the ends on the supporting plate 18 for swinging movement in a vertical plane perpendicular to the axis of the bushing 19 and having the lower ends extending at opposite sides of a reciprocable cam member 46. The reciprocable cam member 46 is shown in Figure 2 as having a reduced cylindrical portion 47 integrally connected to the portion 48 of maximum diameter through the medium of a frusto-conical intermediate portion 49. As shown in Figure 3, the cam is engaged by a pair of cam followers 50 respectively connected to the lower ends of the arms 45 and yieldably urged into frictional engagement with diametrically opposite sides of the cam 46 by means of the springs 51. The arrangement is such that when the cam 46 is in a position wherein the reduced portion 47 thereof is engaged by the followers 50, the arms 45 are free and, as the cam 46 is advanced, the followers are successively engaged by the frusto-conical and cylindrical portions of the cam to clamp the complementary halves of the bushing together.

The cam member 46 is reciprocated by means of a fluid pressure actuated device 52 comprising a cylinder 53 and a piston 54 operatively connected to the inner end of the cam 46 by means of a connecting rod 55. As will be presently described, the cylinder 53 is connected in the closed hydraulic system in such a manner that the piston 54 is moved inwardly after the electrodes are relatively moved into engagement with the work to effect an axial displacement of the cam 46. In Figure 2 of the drawings, the parts are shown in an intermediate position wherein the cam 46 has just completed swinging the upper ends of the arms 45 toward each other to locate the electrical conductor within the bore 43 and to position the bushing 42 in operative relationship to the outer end of the bushing 19.

It will, of course, be understood from the foregoing that when the piston 54 is in its retracted position in the cylinder 53, the reduced portion 47 of the cam 46 assumes a position between the cam followers 50. As a result, the upper ends of the arms 45 may be readily separated to permit the electrical conductor to be positioned between the complementary halves of the bushing 42. As the piston 54 is advanced into the cylinder 52, the frusto-conical portion 49 of the cam acts upon the followers 50 to swing the upper ends of the arms 45 toward each other until the cam followers 50 engage the cylindrical portion 48 of maximum diameter of the cam. In this relative position of the parts, the springs 51 are under compression and the complementary halves of the bushing 42 are yieldably clamped together to form the shoulder 44 previously stated as engageable with the inner end of the terminal in dependence upon exerting a pull on the electrical conductor in the direction of the arrow 41.

As advancement of the cam 46 is continued by movement of the piston 54 in the cylinder 53, the desired pull is applied to the electrical conductors in the direction of the arrow 41 to test the weld between the terminal 21 and the bare end of the electrical conductor. For accomplishing this result, a swinging frame 56 is pivotally connected at its lower end to a bracket 57 extending outwardly from the supporting plate 18. Upon reference to Figure 4, it will be noted that a pair of jaws 58 is pivotally mounted intermediate the ends thereof on the outer side of the swinging frame 56 adjacent the upper end of the latter. The upper ends of the jaws 58 are adapted to grip the electrical conductor and the lower ends of the jaws are provided with cam surfaces 59 respectively frictionally engageable with opposite sides of a vertically reciprocable cam 60. The cam surfaces 59 are yieldably urged into frictional engagement with opposite sides of the cam 60 by means of a coil spring 61 having the opposite ends respectively secured to the lower ends of the jaws.

The upper end of the vertically reciprocable cam 60 is formed with an enlarged head portion 62 and the lower end of the cam 60 is pivotally connected to a plunger 63 of a solenoid 64 suitably secured to the outer side of the swinging frame 56. The solenoid plunger 63 is normally urged in an upward direction by means of a spring 65 and, as a result, the clamping jaws 58 are normally in their released positions with respect to the electrical conductor.

The solenoid 64 is arranged in an electric circuit 66 including a switch 67 positioned for operation by a cam 68 secured to the cam shaft 26 adjacent the cam 40. The arrangement is such that when the circuit 38 is closed by the manually operable switch 39 to effect operation of the cam shaft 26 and initiate the weld, the switch 67 is also closed to energize the solenoid 64. When the solenoid 64 is energized, the plunger 63 moves downwardly against the action of the spring 65 and effects a corresponding downward movement of the cam 60. As the cam 60 moves downwardly, the enlarged portion 62 engages the cam surfaces 59 and moves the upper ends of the jaws 58 into clamping engagement with the electrical conductor.

After the weld has been completed, the frame 56 is swung outwardly in the direction of the arrow 69 in Figure 2 and since the jaws 58 are carried by the frame, it necessarily follows that a pull is applied to the electrical conductors in the direction of the arrow 41 in Figure 2. As will be observed from this latter figure, the pull is exerted against the action of the spring 70 by means of the cam 46 during the final advancing movement of the piston 54 in the cylinder 53. As will be more fully hereinafter set forth, the pressure acting on the piston 54 to swing the frame 56 in the direction of the arrow 69 is predetermined and is regulated to provide for applying different degrees of pull to the electrical conductor. It may further be pointed out at this time that the switch 67 is held in its closed position until after the desired pull has been applied to the electrical conductor by a time controlled relay 67'. This relay is adjusted to automatically open the switch 67 and release the jaws after the weld has been tested and before the next cycle of operation.

Hydraulic control system

The hydraulic control system, shown in Figure 1, is of the flooded type and is designed to operate the several instrumentalities previously described in their proper sequence. Upon reference to Figure 1, it will be noted that the reference character 71 designates a pressure pump driven directly by the prime mover 28 and having the intake side communicating with a tank or reservoir 72 containing the hydraulic fluid medium. The pressure side of the pump 71 communicates with a four-way valve 73 through the medium of a pressure relief valve 74 having the relief port communicating with the reservoir 72. The control valve 73 is of the balanced type and, for the purpose of simplicity, this valve is shown on the diagram as operated by a piston 75 reciprocably mounted in a cylinder 76. The space in the cylinder 76 at opposite ends of the piston communicates with the pressure side of the pump 71 through the medium of restricted ports or bleed openings 77. One end of the cylinder 76 communicates with the reservoir 72 through the medium of a conduit 78 while the opposite end of the cylinder 76 communicates with the reservoir 72 through the medium of a conduit 79 and a normally closed pressure valve 80 to be more fully hereinafter described.

The communication between the conduit 78 and the reservoir 72 is controlled by a valve 81 having an intake port 82 connected to the conduit 78 and having an exhaust port 83 connected to the reservoir. A valve seat 84 is arranged between the two ports and is normally closed by a valve plunger 85 having a head portion 86 urged into engagement with the valve seat 84 by means of a spring 87. The plunger 85 is moved out of engagement with the valve seat to establish communication between the ports by means of the cam 40, previously described as secured to the cam shaft 26 of the welder. The arrangement is such that when the rotation of the cam shaft 26 is initiated, the cam 40 opens the valve 81 and establishes communication between the reservoir and the end of the cylinder 76 connected to the conduit 78. As a result, the pressure in this end of the cylinder drops below the pressure in the opposite end of the cylinder and the piston 75 is moved in a direction to shift the control valve plunger 89 in the direction of the arrow 90. It may be pointed out at this time that due to the restricted ports 77, fluid under pressure is exhausted from the cylinder faster than it is admitted to the cylinder by the pump and this arrangement renders it possible to provide the differential pressures in the opposite ends of the cylinders required to operate the control valve.

Shifting movement of the control valve 89 in the direction of the arrow 90 connects the upper end of the cylinder 17 to the pressure side of the pump through the medium of a conduit 91 and a pressure relief valve 92. At the same time, the control valve 73 establishes communication between the lower end of the cylinder 17 and the reservoir 72 through the medium of a conduit 93. As a result, the pressure below the piston 15 in the cylinder 17 drops below the pressure at the upper end of the piston and the latter is moved downwardly to engage the electrode 12 with the end 22 of the terminal to be welded on the electrical conductor.

When the pressure in the cylinder 17, above the piston 15, exceeds a predetermined amount, the relief valve 92 is opened and fluid under pressure is supplied to the outer end of the cylinder 53 through the medium of a second pressure relief valve 94. As a result, the piston 54 is advanced in the cylinder 53 to move the cam 46 in a direction to successively move the complementary halves of the bushing 42 into operative relationship with the terminal 21 and to apply the desired pull on the electrical conductor 20. It will, of course, be understood that by the time the cam 46 operates to swing the clamping jaws 58 in a direction to pull the electrical conductor, the switch 67 has been operated to move the jaws 58 into clamping engagement with the electrical conductor and the welding circuit is opened by the switch 24. It should further be understood at this time that the relief valve 74 may be adjusted to obtain various different degrees of pull on the electrical conductor and a suitable pressure gauge 95 is provided to indicate the pressures.

When the pressure in the relief valve 94 exceeds the predetermined value at which this valve is set, the latter opens and fluid under pressure flows into the top of the valve 80. The valve 80 is provided with an intake port 96 communicating with the conduit 79 and is also provided with an exhaust port 97 communicating with the reservoir 72. In addition, the valve 80 is fashioned with an apertured valve seat 98 between the two ports and this aperture is normally closed by a valve plunger 99 urged into engagement with the seat by a coil spring 99'. With this arrangement, fluid under pressure entering the top of the valve 80 forces the valve plunger 99 downwardly against the action of the spring 99' to open communication between the conduit 79 and the reservoir. Inasmuch as the valve 81 is closed at this time, it follows that the pressure drops in the end of the cylinder 76 communicating with the conduit 79 and the piston 75 is moved toward the latter end of the cylinder by the higher pressure at the opposite side of the piston. This action, of course, shifts the control valve 73 to a position wherein the conduit 91, communicating with the upper end of the cylinder 17, is connected to the pressure side of the pump. As a result, the piston 15 in the cylinder 17 moves upwardly to return the electrode 12 to its inoperative position.

It will also be noted that a drop in pressure in the upper end of the cylinder 17 or in the conduit 91 permits the pressure relief valves 92 and 94 to move to their closed positions. Closing of the pressure relief valve 94 reduces the pressure on the upper end of the plunger 99 in the valve 80 and permits operation of the plunger 99 by the spring to close communication between the reservoir and the conduit 79. In addition, it will be noted that closing of the two pressure relief valves 92 and 94 effects a drop in pressure in the cylinder 53 at the outer side of the piston 54. Inasmuch as the opposite end of the cylinder 53 communicates with the conduit 93 or with the lower end of the cylinder 17 through the medium of the conduit 93', it follows that the piston 54 is also returned to its normal position by the increased pressure acting on the forward side thereof. When the above condition exists, the pressures at opposite ends of the pistons in the several cylinders of the hydraulic system are again balanced and the system is in readiness for the next cycle of operation.

Operation

The operator places a terminal fitting 21 on the bare end of an electrical conductor 20 and then positions the terminal fitting 21 in the bushing 19 in the manner shown in Figure 2 with the end 22 of the terminal in the path of travel of the electrode 12. Also, care is taken to support the electrical conductor in a position between the relatively movable clamping jaws 58. The switch 39 is then closed by the operator to effect a rotation of the cam shaft 26. As the cam shaft 26 rotates, the switch 67 is closed to operate the solenoid 64 and thereby move the jaws 58 into clamping engagement with the electrical conductor. Continued rotation of the cam shaft 26 opens the valve 81 and effects a movement of the electrode 12 into engagement with the end 22 of the terminal in the manner described at some length above.

Immediately after the end 22 of the terminal is effectively clamped between the electrodes, the switch 24 is closed to start the weld and after a predetermined time interval elapses, the relay 27 operates to automatically open the switch 24 to discontinue the weld.

When the clamping pressure of the electrodes on the terminal exceeds the pressure at which the valve 92 is set, the fluid operated piston 54 is advanced to operate the cam 46 and move the complementary halves of the bushing 42 in operative relationship to the bushing 19. As the piston 54 continues its advancing movement, the cam 46 applies a force against the jaw carrying frame 56 in the direction of the arrow 69 in Figure 2 and exerts a pull on the electrical conductor. In the event that this pull is sufficient to disengage the end 22 of the terminal from its position between the electrodes, the inner end of the terminal abuts the shoulder 44 formed by the bushing 42 and continued pull of the electrical conductor tends to strip the terminal from the bare end of the conductor. This pull places the weld between the conductor and terminal under a stress which is preferably greater than any stress applied to the weld during actual use of the electrical conductor.

As stated above, when the pressure acting on the piston 54 exceeds the pressure at which the relief valve 94 is set, the electrode 12 is returned to its normal position and the piston 54, as well as the remaining instrumentalities of the hydraulic system, are likewise returned to their initial starting positions. Return movement of the piston 54 in the cylinder 53 operates the cam 46 to relatively move the complementary parts of the bushing 42 away from the electrical conductor and permits the spring 70 to return the swinging frame 56 to its initial starting position. It may be pointed out at this time that the switch 67 is automatically opened by the time relay 67' upon completion of the testing operation and the spring 65 operates the cam 60 to swing the jaws 58 to their open positions wherein the electrical conductor is released.

What I claim as my invention is:

1. In welding equipment, a pair of electrodes relatively movable into engagement with the parts to be welded together and arranged in an electric circuit, means for relatively moving the electrodes into and out of engagement with said parts, a switch in said welding circuit, means for closing and opening the switch during the time interval the electrodes are engaged with the work, and means operating in timed relation to opening of the switch to apply a force on one of said parts tending to move the latter relative to the other of said parts in a direction to place the weld between the parts under stress.

2. In welding equipment, a pair of electrodes relatively movable into engagement with the parts to be welded together and arranged in an electric circuit, means for relatively moving the electrodes into and out of engagement with said parts, a switch in said circuit, means for closing and opening said switch during the time interval the electrodes are engaged with the parts, and means responsive to the clamping pressure applied to the parts by the electrodes to apply a force on one of the parts tending to move the latter relative to the other part in a direction to place a stress on the weld between said parts.

3. In welding equipment, a pair of electrodes relatively movable into engagement with the parts to be welded together and arranged in an electric circuit, fluid pressure operated means for relatively moving the electrodes into and out of engagement with said parts, a switch in said circuit, means for closing and opening the switch during the time interval the electrodes are engaged with the parts, and means operated by the fluid pressure acting on the electrode moving means when this pressure exceeds a predetermined value to apply a force on one of the parts tending to move the latter relative to the other part in a direction to place the weld between the parts under stress.

4. In welding equipment, a pair of electrodes relatively movable into engagement with the parts to be welded together and arranged in an electric circuit, means operated by fluid under pressure for moving one of the electrodes toward the other to clamp the parts to be welded therebetween, a switch in the electric circuit, means for closing and opening the switch during the time interval the electrodes are engaged with the parts, and means responsive to a predetermined increase in the pressure acting on said electrode moving means to apply a force on one of the parts tending to move the latter relative to the other part in a direction to place the weld between said parts under stress.

5. In welding equipment, a pair of electrodes relatively movable into engagement with the parts to be welded together and arranged in an electric circuit, means operated by fluid under pressure for moving one of the electrodes toward the other to clamp the parts to be welded therebetween, a switch in the electric circuit, means for closing and opening the switch during the time interval the electrodes are engaged with the parts, means responsive to a predetermined increase in the pressure acting on said electrode moving means to apply a force on one of the parts tending to move the latter relative to the other part in a direction to place the weld between said parts under stress, and means responsive to a predetermined increase in the fluid pressure acting on the last named means to effect movement of the fluid pressure operated electrode in a direction away from said parts to release the latter.

6. In welding equipment, a pair of electrodes relatively movable into engagement with the parts to be welded together and arranged in an electric circuit, means for relatively moving the electrodes into and out of engagement with said parts, a switch in said circuit, means for closing and opening the switch during the time interval the electrodes are engaged with said parts, means operating in timed relation to relative movement of the electrodes into engagement with the work to grip one of the parts at a point spaced from the point of engagement of the electrodes with said parts, and means operating in timed relation to opening of the switch to apply a force on the gripping means in a direction tending to displace the part gripped by said means relative to the other part and thereby place the weld between the parts under a stress.

7. In welding equipment, a pair of electrodes relatively movable into engagement with the parts to be welded together and arranged in an electric circuit, means for relatively moving the electrodes into and out of engagement with said parts, a switch in said circuit, means for closing and opening the switch during the time interval the electrodes are in engagement with said parts, a pair of cooperating clamping jaws relatively movable toward each other to grip one of the parts to be welded therebetween and supported for movement in a direction away from the electrodes to exert a pull on the latter part, and means operating in timed relation to opening of said welding circuit by said switch to apply a force on said jaws tending to move the latter in a direction away from the electrodes and thereby place the weld between said parts under stress.

8. In welding equipment, a pair of electrodes relatively movable into engagement with the parts to be welded together and arranged in an electric circuit, means for relatively moving the electrodes into and out of engagement with said parts, a switch in said circuit, means for closing and opening the switch during the time interval the electrodes are in engagement with said parts, a pair of clamping jaws adapted to grip one of the parts to be welded therebetween and supported for swinging movement in directions toward and away from the electrodes, means operating in timed relation to opening of said welding circuit by said switch to apply a force on said jaws tending to swing the latter in a direction away from the electrodes and thereby place the weld between said parts under stress, and means for controlling the force applied to said jaws to vary the stress applied to the weld.

9. In welding equipment, a pair of electrodes relatively movable into engagement with the parts to be welded together and arranged in an electric circuit, means for relatively moving the electrodes into and out of engagement with said parts, a switch in said circuit, means for closing and opening the switch during the time interval the electrodes are in engagement with said parts, a pair of cooperating clamping jaws relatively movable toward each other to grip one of the parts to be welded therebetween and supported for movement in a direction away from the electrodes to exert a pull on the latter part, an abutment movable into a position for engagement with the other of said parts to prevent movement of the latter with the part aforesaid in the direction of said pull, and means operating in timed relation to opening of the welding circuit by said switch to successively move the abutment into the position aforesaid and to apply a force on the jaws tending to move the latter in a direction away from the electrodes and thereby place the weld between said parts under stress.

10. In welding equipment, a pair of electrodes relatively movable into engagement with the parts to be welded together and arranged in an electric circuit, means for relatively moving the electrodes into and out of engagement with said parts, a switch in said circuit, means for closing and opening the switch during the time interval the electrodes are in engagement with said parts, means for gripping one of the parts, fluid pressure actuated means operable in timed relation to completion of the weld to apply a force on said gripping means tending to move the latter and part gripped thereby to place the weld between said parts under stress, and means controlling the pressure acting on the last named means to vary the force applied to said gripping means.

11. In welding equipment, a pair of electrodes relatively movable into engagement with the parts to be welded together and arranged in an electric circuit, means for relatively moving the electrodes into and out of engagement with said parts, a switch in said circuit, means for closing and opening the switch during the time interval the electrodes are in engagement with said parts, means for gripping one of the parts, means operable in timed relation to completion of the weld to apply a force on the gripping means tending to move the latter and part gripped thereby in a direction to place the weld between said parts under stress, an abutment movable into a position for engagement with the other of said parts to prevent movement of the latter in the direction aforesaid, and means for moving said abutment to the position aforesaid prior to applying said force on the gripping means.

RUSSELL A. FUNK.